US012075846B2

(12) United States Patent
Park

(10) Patent No.: US 12,075,846 B2
(45) Date of Patent: Sep. 3, 2024

(54) CLEANING DEVICE AND AEROSOL-GENERATING SYSTEM INCLUDING THE SAME

(71) Applicant: KT&G CORPORATION, Daejeon (KR)

(72) Inventor: Sang Kyu Park, Seoul (KR)

(73) Assignee: KT&G CORPORATION, Daejeon (KR)

( * ) Notice: Subject to any disclaimer, the term of this patent is extended or adjusted under 35 U.S.C. 154(b) by 729 days.

(21) Appl. No.: 17/268,990

(22) PCT Filed: Aug. 6, 2020

(86) PCT No.: PCT/KR2020/010386
§ 371 (c)(1),
(2) Date: Feb. 17, 2021

(87) PCT Pub. No.: WO2021/029611
PCT Pub. Date: Feb. 18, 2021

(65) Prior Publication Data
US 2022/0295906 A1 Sep. 22, 2022

(30) Foreign Application Priority Data
Aug. 9, 2019 (KR) ........................ 10-2019-0097635

(51) Int. Cl.
*A24F 40/85* (2020.01)
*A24F 40/40* (2020.01)
(Continued)

(52) U.S. Cl.
CPC .............. *A24F 40/85* (2020.01); *A24F 40/40* (2020.01); *A24F 40/46* (2020.01); *A24F 40/465* (2020.01);
(Continued)

(58) Field of Classification Search
CPC .......... A24F 40/85; A24F 40/40; A24F 40/46; A24F 40/465; A24F 9/06; A24F 40/90;
(Continued)

(56) References Cited

U.S. PATENT DOCUMENTS 5,878,752 A 3/1999 Adams et al.
9,220,304 B2 12/2015 Greim
(Continued)

FOREIGN PATENT DOCUMENTS

CN 102470225 A 5/2012
CN 104095295 A 10/2014
(Continued)

OTHER PUBLICATIONS

Extended European Search Report dated Nov. 8, 2021 in European Application No. 20851476.0.
(Continued)

*Primary Examiner* — Justin M Kratt
(74) *Attorney, Agent, or Firm* — Sughrue Mion, PLLC

(57) ABSTRACT

The present disclosure relates to a cleaning device and an aerosol-generating system including the same. Since the cleaning device according to an embodiment may receive electrical energy wirelessly from the aerosol-generating device, the cleaning device may operate without an internal battery or a wired power connection. Therefore, a weight of the cleaning device and its manufacturing cost may be reduced, and a user does not need to charge the cleaning device regularly.

13 Claims, 4 Drawing Sheets

(51) Int. Cl.

| | |
|---|---|
| ***A24F 40/46*** | (2020.01) |
| ***A24F 40/465*** | (2020.01) |
| ***B08B 1/12*** | (2024.01) |
| ***B08B 7/00*** | (2006.01) |
| *A24F 9/06* | (2006.01) |
| *A24F 40/90* | (2020.01) |
| *B08B 1/10* | (2024.01) |
| *B08B 1/14* | (2024.01) |
| *B08B 1/32* | (2024.01) |
| *B08B 1/50* | (2024.01) |

(52) U.S. Cl.
CPC .............. *B08B 1/12* (2024.01); *B08B 7/0071* (2013.01); *A24F 9/06* (2013.01); *A24F 40/90* (2020.01); *B08B 1/10* (2024.01); *B08B 1/145* (2024.01); *B08B 1/32* (2024.01); *B08B 1/50* (2024.01)

(58) Field of Classification Search
CPC ....... B08B 1/002; B08B 7/0071; B08B 1/001; B08B 1/003; B08B 1/007; B08B 1/04; B08B 1/12; B08B 1/10; B08B 1/145; B08B 1/32; B08B 1/50
See application file for complete search history.

(56) References Cited

U.S. PATENT DOCUMENTS

| | | | | |
|---|---|---|---|---|
| 10,869,499 | B2 | 12/2020 | Fernando et al. | |
| 2004/0149297 | A1 * | 8/2004 | Sharpe | A24F 40/85 131/194 |
| 2012/0285447 | A1 | 11/2012 | Schipper et al. | |
| 2018/0110262 | A1 | 4/2018 | Batista et al. | |
| 2020/0037664 | A1 | 2/2020 | Fursa et al. | |
| 2020/0154775 | A1 | 5/2020 | Lee et al. | |

FOREIGN PATENT DOCUMENTS

| | | | | |
|---|---|---|---|---|
| CN | 206079037 | U | 4/2017 | |
| CN | 107427083 | A | 12/2017 | |
| KR | 10-0495099 | B1 | 11/2005 | |
| KR | 20-2012-0008151 | U | 11/2012 | |
| KR | 20-2012-0008831 | U | 12/2012 | |
| KR | 10-2014-0109455 | A | 9/2014 | |
| KR | 10-1776966 | B1 | 9/2017 | |
| KR | 10-2018-0070441 | A | 6/2018 | |
| KR | 10-2019-0084952 | A | 7/2019 | |
| WO | 2018/001910 | A1 | 1/2018 | |
| WO | 2018/190601 | A1 | 10/2018 | |
| WO | WO-2018190601 | A1 * | 10/2018 | A24F 40/40 |
| WO | 2019/030166 | A1 | 2/2019 | |

OTHER PUBLICATIONS

Chinese Office Action issued Apr. 18, 2023, in Chinese Application No. 202080005741.2.
Office Action issued Aug. 30, 2022 in Japanese Application No. 2021-537046.
International Search Report of PCT/KR2020/010386 dated Dec. 30, 2020 [PCT/ISA/210].
Written Opinion of PCT/KR2020/010386 dated Dec. 30, 2020 [PCT/ISA/237].
Korean Office Action of KR 10-2019-0097635 dated Dec. 22, 2020.

* cited by examiner

[Fig. 1]
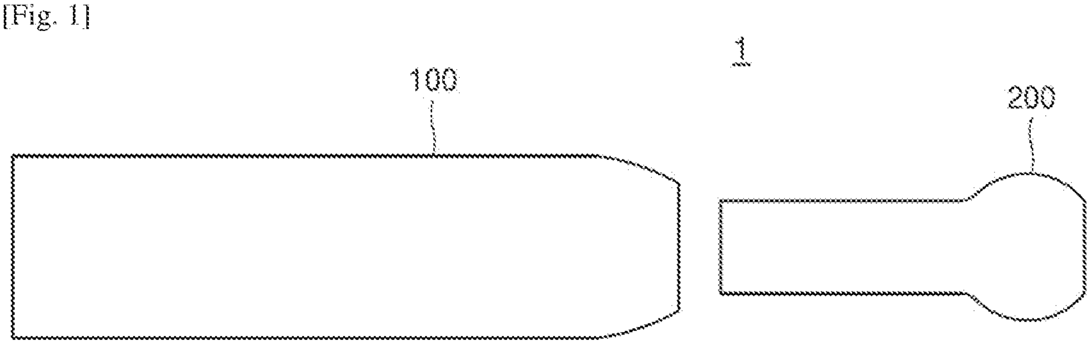
[Fig. 2]
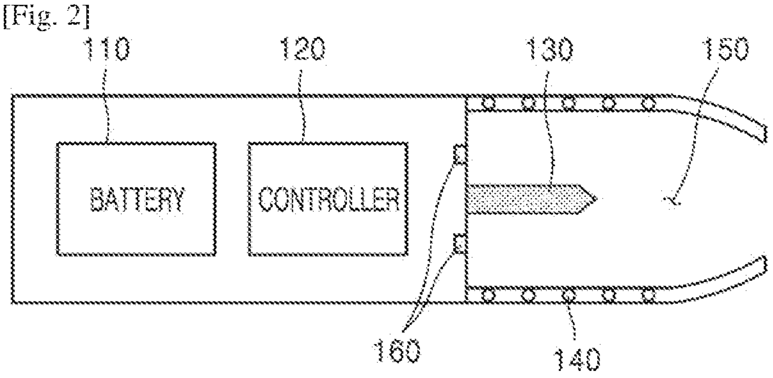
[Fig. 3A]
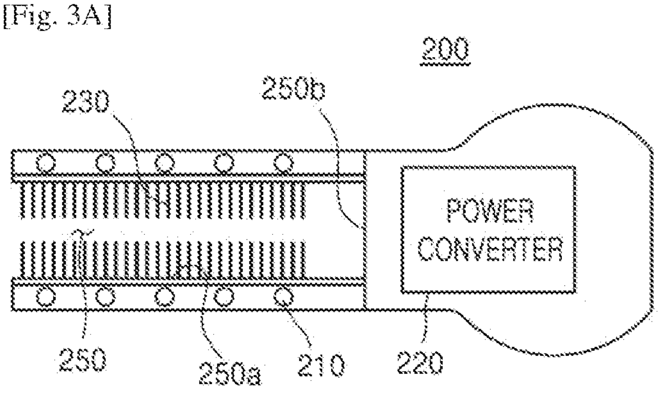
[Fig. 3B]
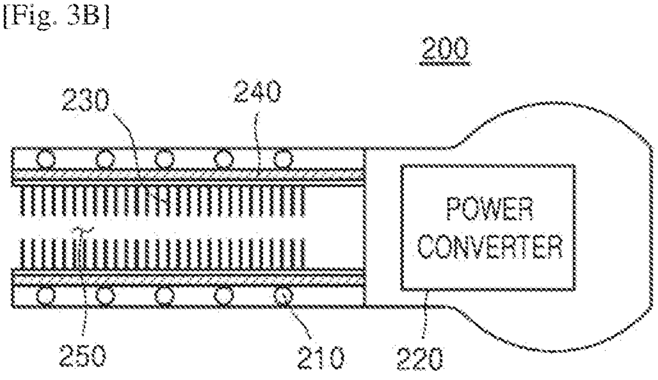

[Fig. 3C]
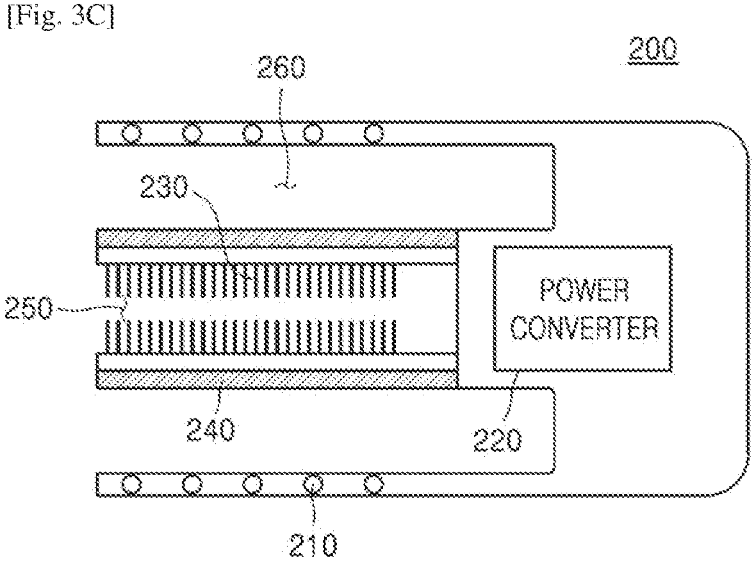
[Fig. 4A]
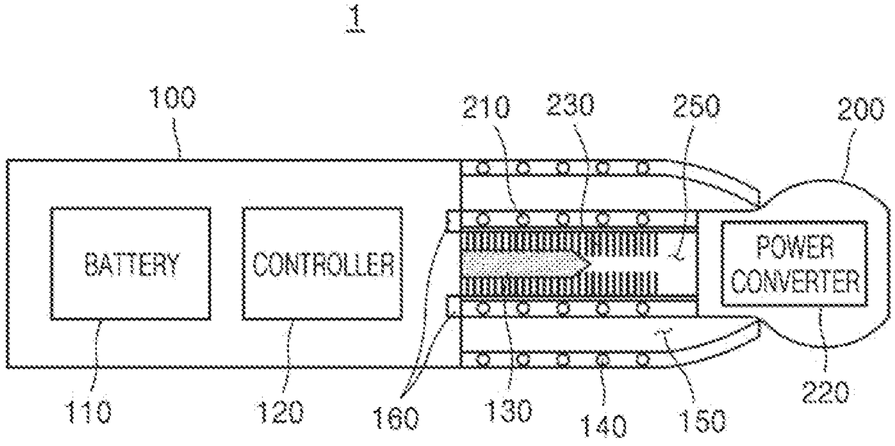
[Fig. 4B]
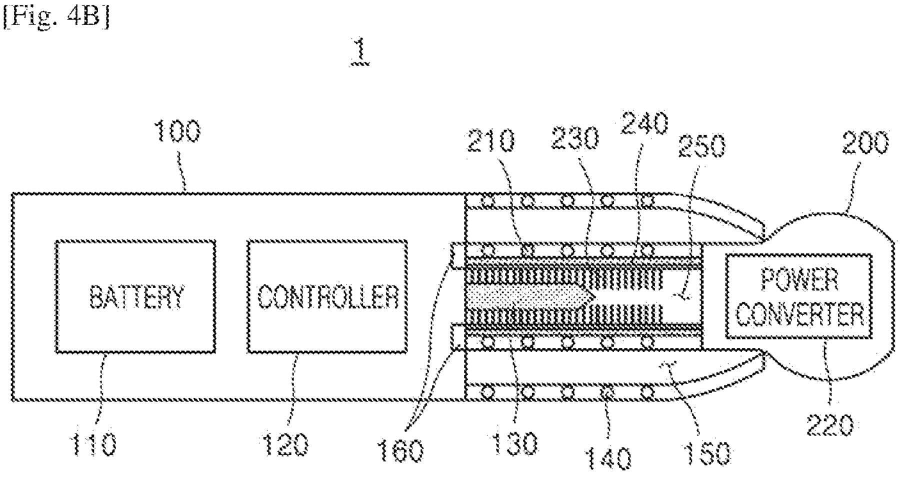

[Fig. 4C]
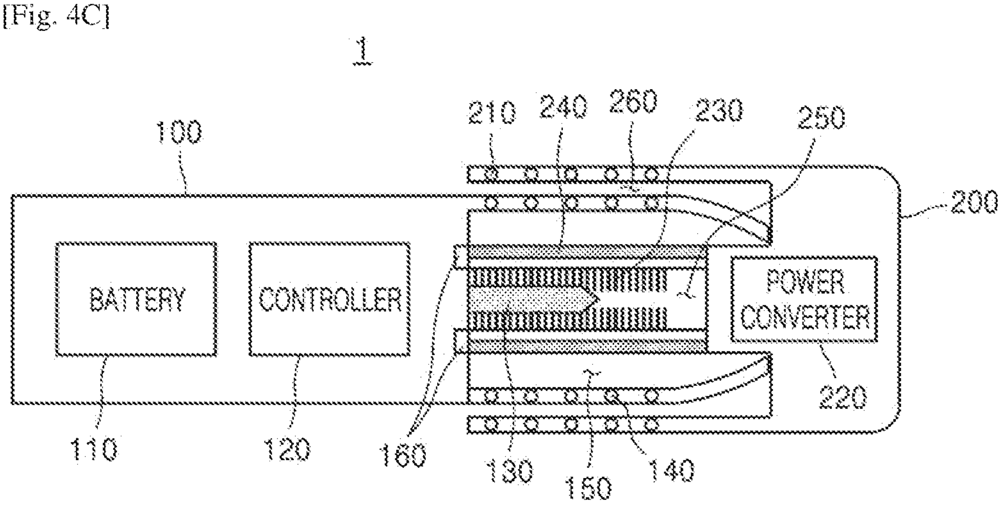
[Fig. 5]
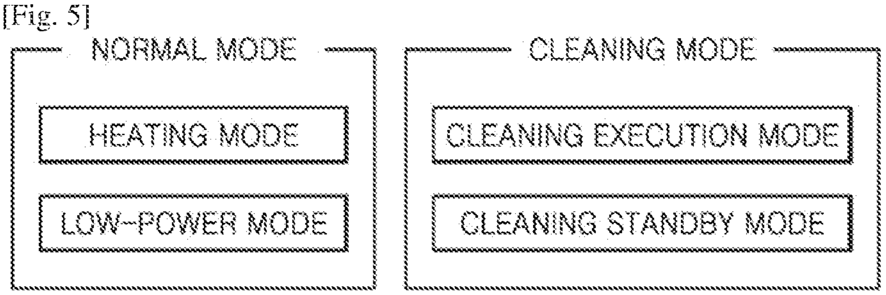

[Fig. 6]
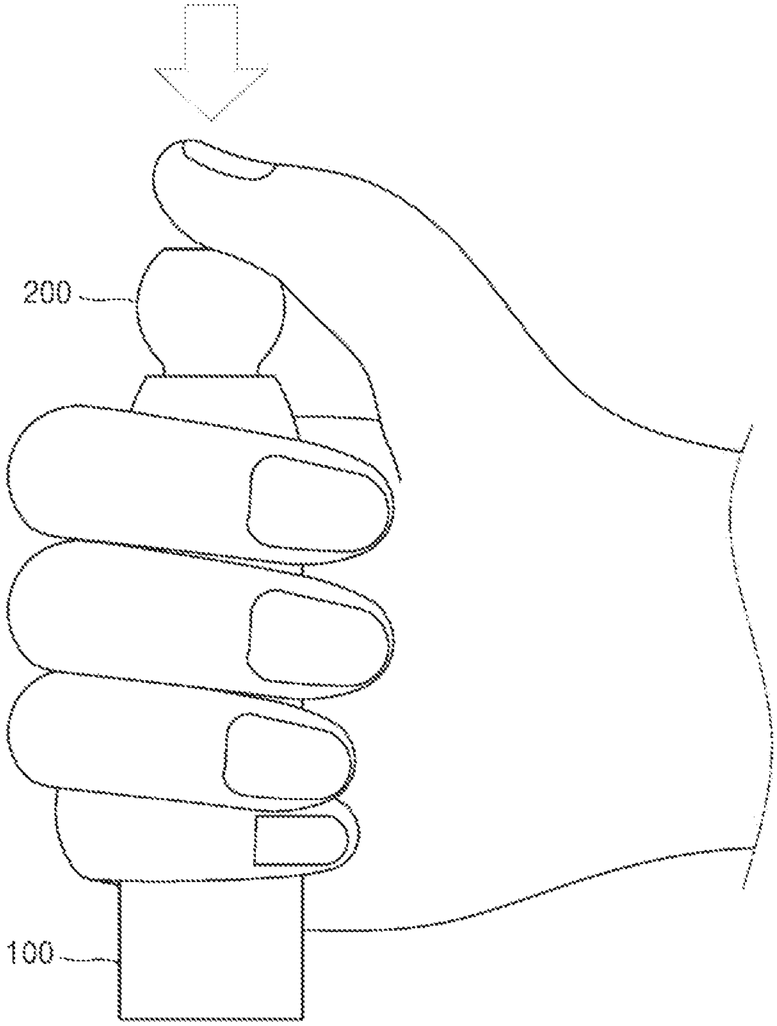

CLEANING DEVICE AND AEROSOL-GENERATING SYSTEM INCLUDING THE SAME

CROSS REFERENCE TO RELATED APPLICATIONS

This application is a National Stage of International Application No. PCT/KR2020/010386 filed on Aug. 6, 2020, claiming priority based on Korean Patent Application No. 10-2019-0097635 filed on Aug. 9, 2019.

TECHNICAL FIELD

The present disclosure relates to a cleaning device and an aerosol-generating device, and an aerosol-generating system including the same.

BACKGROUND ART

Recently, the demand for alternatives to traditional cigarettes has increased. For example, there is growing demand for aerosol generating devices that generate aerosol by heating an aerosol generating material in cigarettes, rather than by combusting cigarettes. Accordingly, studies on a heating-type cigarette and a heating-type aerosol generating device have been actively conducted.

After use of an aerosol-generating device, foreign substances, such as cigarette ash, may be left in the aerosol-generating device. A cleaning device may be used to remove the foreign substances remaining in the aerosol-generating device.

When using such cleaning devices, a user needs to be recharge its internal battery regularly or has to connect its power connection terminal to an external power source through a wire.

DISCLOSURE OF INVENTION

Solution to Problem

Embodiments of the present invention provide a cleaning device that is capable of operating without an internal battery and a wired power connection, and an aerosol-generating system including the same.

A cleaning device used to clean an aerosol-generating device according to an embodiment may include a power receiver configured to wirelessly receive electrical energy from the aerosol-generating device; a power converter configured to convert the electrical energy received by the power receiver to mechanical energy; and a cleaning member configured to clean the aerosol-generating device by the mechanical.

The technical problem is not limited to the above, and other technical problems may be inferred from the following examples.

Advantageous Effects of Invention

A cleaning device may operate without an internal battery or a wired power connection, because the cleaning device may receive electrical energy wirelessly from the aerosol-generating device. Therefore, a weight of the cleaning device and the manufacturing cost may be reduced, and a user may conveniently use the cleaning device without charging the cleaning device. In addition, the life of a cleaning device does not have to depend on the life of its internal battery.

In addition, an aerosol-generating device may supply power to the cleaning device without additional components, because electrical energy may be transferred to the cleaning device using a power transmitter used to heat a heater of the aerosol-generating device.

In addition, according to an embodiment, the aerosol-generating system starts a cleaning execution mode in response to an operation of a user pressing the cleaning device toward the aerosol-generating device, so the user may perform cleaning by a simple operation.

Various effects of the invention are described in the detailed description of the invention.

BRIEF DESCRIPTION OF DRAWINGS

FIG. 1 shows an embodiment of an aerosol-generating system.

FIG. 2 shows an embodiment of an aerosol-generating device.

FIGS. 3A to 3C show embodiments of a cleaning device.

FIGS. 4A to 4C show embodiments of an aerosol-generating system.

FIG. 5 shows one embodiment of an operating mode of an aerosol-generating system.

FIG. 6 shows an embodiment of a method by which a user presses a cleaning device towards an aerosol-generating system.

BEST MODE FOR CARRYING OUT THE INVENTION

A cleaning device used to clean an aerosol-generating device according to an embodiment may include a power receiver configured to wirelessly receive electrical energy from the aerosol-generating device; a power converter configured to convert the electrical energy received by the power receiver to mechanical energy; and a cleaning member configured to clean the aerosol-generating device by the mechanical.

In addition, in the cleaning device according to an embodiment, the power receiver may include a sub-coil that generates a current that is induced by the aerosol-generating device in the sub-coil.

In addition, in the cleaning device according to an embodiment, the power converter includes a motor.

An aerosol-generating system according to an embodiment may include an aerosol-generating device comprising: a battery; a power transmitter configured to receive power from the battery; and a controller configured to control the power supplied from the battery to the power transmitter; and a cleaning device comprising: a power receiver configured to wirelessly receive electrical energy from the power transmitter; a power converter configured to convert the electrical energy received by the power receiver to mechanical energy; and a cleaning member configured to clean the aerosol-generating device by the mechanical energy.

In addition, in the aerosol-generating system according to an embodiment, the power transmitter may include a main coil, the power receiver may include a sub-coil configured to generate a current induced by the main coil.

In addition, in the aerosol-generating system according to an embodiment, the aerosol-generating system may operate in a cleaning mode when the aerosol-generating device and the cleaning device are combined, and operate in a normal mode when the aerosol-generating device and the cleaning device are separated from each other, and the controller may control the power such that a current having a first frequency flows through the main coil in the cleaning mode and a current having a second frequency flows through the main coil in the normal mode.

In addition, in the aerosol-generating system according to an embodiment, the aerosol-generating device further includes a heater inductively heated by the main coil to heat a cigarette.

In addition, in the aerosol-generating system according to an embodiment, the first frequency and the second frequency are the same.

In addition, in the aerosol-generating system according to an embodiment, the first frequency and the second frequency are different.

In addition, in the aerosol-generating system according to an embodiment, the current having the first frequency may transmit electrical energy to the sub-coil such that that the cleaning member operates, and the current having the second frequency may cause the main coil to inductively heat the heater.

In addition, in the aerosol-generating system according to an embodiment, the aerosol-generating device may further include a main insertion groove in which the heater is arranged and the cleaning device is inserted, the cleaning device may further include a sub insertion groove into which the heater is inserted, the main coil may be arranged to surround the main insertion groove, and the sub-coil is arranged to surround the sub insertion groove.

In addition, in the aerosol-generating system according to an embodiment, the cleaning device may further include a blocking member arranged between the main coil and the heater while the aerosol-generating device and the cleaning device are combined, such that a magnetic field generated by the main coil is blocked by the blocking member.

In addition, in the aerosol-generating system according to an embodiment, the heater may be heated at a lower temperature in the cleaning mode than in the normal mode.

In addition, in the aerosol-generating system according to an embodiment, the cleaning mode may include a cleaning standby mode in which the cleaning member does not operate and a cleaning execution mode in which the cleaning member operates, the aerosol-generating device further includes a pressure sensor configured to detect a pressure applied toward a bottom of the main insertion groove, and the controller switches from the cleaning standby mode to the cleaning execution mode when the detected pressure is equal to or greater than a reference pressure.

Mode for the Invention

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and/or operation and can be implemented by hardware components or software components and combinations thereof.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Like numerals refer to like elements throughout.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

Hereinafter, embodiments of the present disclosure will be described in detail with reference to the drawings.

FIG. 1 shows an embodiment of an aerosol-generating system.

The aerosol-generating system 1 may include an aerosol-generating device 100 and a cleaning device 200. The aerosol-generating device 100 may be a device that generates an aerosol by heating a solid or liquid aerosol-generating material. For example, the aerosol-generating device 100 may be an electronic cigarette that provides nicotine to a user. The cleaning device 200 may be a device used to clean the inside and/or outside of the aerosol-generating device 100.

FIG. 2 shows an embodiment of an aerosol-generating device.

The aerosol-generating device according to an embodiment may include a battery 110, a controller 120, a heater 130, and a power transmitter 140.

In FIG. 2, the battery 110, the controller 120, and the heater 130 are shown as being arranged in a line. However, an internal structure of the aerosol-generating device is not limited to the internal structure shown in FIG. 2. In other words, according to the design of the aerosol-generating device, an arrangement of the battery 110, the controller 120, and the heater 130 may be changed.

The battery 110 may supply power to be used for the aerosol generating device to operate. For example, the battery 110 may supply power for heating the heater 130 and supply power for operating the control unit 120 and the power transmitter 140. Also, the battery 110 may supply power for operations of a display, a sensor, a motor, etc.

mounted in the aerosol generating device. Also, the battery 110 may supply power for operations of the cleaning device (200 in FIG. 1).

The controller 120 may control overall operations of the aerosol generating device. In detail, the controller 120 controls not only operations of the battery 110, the heater 130, and the power transmitter 140, but also operations of other components included in the aerosol generating device. Also, the controller 120 may check a state of each of the components of the aerosol generating device to determine whether or not the aerosol generating device is able to operate.

The controller 120 may include at least one processor. A processor can be implemented as an array of a plurality of logic gates or can be implemented as a combination of a general-purpose microprocessor and a memory in which a program executable in the microprocessor is stored. It will be understood by one of ordinary skill in the art that the processor can be implemented in other forms of hardware.

The heater 130 may be an induction heater. In detail, the heater 130 may include a susceptor and may be inductively heated by the power transmitter 140. For example, when a cigarette is inserted into the aerosol-generating device, the heater 130 may be located inside the cigarette. As such, the heated heater 130 may increase a temperature of the aerosol-generating material in the cigarette.

The heater 130 may include an electro-resistive heater. For example, the heater 130 may include an electrically conductive track, and the heater 130 may be heated when currents flow through the electrically conductive track.

However, the heater 130 is not limited to the example described above, and may include any other heaters capable of being heated to a desired temperature may be used. Here, the desired temperature may be pre-set in the aerosol generating device or may be set by a user.

For example, the heater 130 may include a tube-type heating element, a plate-type heating element, a needle-type heating element, or a rod-type heating element. The heater 130 may heat the inside or the outside of the cigarette, according to the shape of the heating element.

Also, the aerosol generating device may include a plurality of heaters 130. Here, the plurality of heaters 130 may be inserted into the cigarette or may be arranged outside the cigarette. Alternatively, some of the plurality of heaters 130 may be inserted into the cigarette, and the others may be arranged outside the cigarette. The shape of the heater 130 is not limited to the shape illustrated in FIG. 2, and may include various shapes.

The power transmitter 140 may be electrically connected to the battery 110 and receive power from the battery 110. In addition, the power transmitter 140 may wirelessly transmit electrical energy to the cleaning device (200 in FIG. 1).

The power transmitter 140 may include a main coil. The main coil 140 may be arranged to surround a main insertion groove 150 into which the cigarette is inserted, such that the main coil 140 is disposed near the heater 130. The heater 130 may include a susceptor which is inductively heated by a magnetic field generated by the main coil 140.

The aerosol-generating device may further include a pressure sensor 160. The pressure sensor 160 may be arranged toward the main insertion groove 150. The pressure sensor 160 may sense a pressure applied to the aerosol-generating device 100 (i.e., a pressure applied against the bottom of the main insertion groove 150) by the cleaning device (200 in FIG. 1) inserted into the main insertion groove 150.

FIG. 3A shows an embodiment of a cleaning device.

The cleaning device 200 may include a power receiver 210, a power converter 220, and a cleaning member 230.

The cleaning device 200 may include a sub-insertion groove 250 into which the heating portion (130 of FIG. 2) of the aerosol-generating device is inserted when the cleaning device 200 is combined with the aerosol-generating device.

The power receiver 210 may receive electrical energy wirelessly from the aerosol-generating device. The power receiver 210 may include a sub-coil. A current may be induced in the sub-coil 210 by the magnetic field generated by the main coil (140 in FIG. 2) of the aerosol-generating device. The sub-coil 210 may be arranged to surround the sub insertion groove 250.

The power converter 220 may be electrically connected to the power receiver 210 to convert electrical energy received by the power receiver 210 to mechanical energy. The power converter 220 may include a motor. For example, the motor may be a DC motor or an AC motor. When the motor is the DC motor, the power converter 220 may include a rectifying circuit to stably supply DC power to the motor. For example, the motor may be a linear motor.

The cleaning member 230 is a portion that actually cleans aerosol-generating device.

For example, the cleaning member 230 may include a cleaning comb or brush structure. The cleaning member 230 may operate by mechanical energy provided by the power converter 220. For example, the cleaning member 230 may rotate by the motor of the power converter 220. For another example, the cleaning member 230 may linearly move by the linear motor of the power converter 220.

The cleaning member 230 may be arranged in the sub insertion groove 250. For example, the cleaning member 230 may extend in a radial direction of the sub insertion groove 250 from a side wall 250*a* of the sub insertion groove 250. As another example, the cleaning member 230 may extend from an end wall 250*b* of the sub insertion groove 250 in a longitudinal direction of the sub insertion groove 250.

The cleaning member 230 may be a line-shaped brush or a surface-shaped brush. The cleaning member 230 may be made of a heat-resistant material to clean the heated heater (130 of FIG. 2). In addition, the cleaning member 230 may be made of a durable material to be resistant to abrasion. In addition, the cleaning member 230 may be made of a flexible or soft material to prevent damage to the heater (130 in FIG. 2).

The cleaning device 200 may further include an internal battery. In addition, the cleaning device 200 may further include a processor. For example, the processor of the cleaning device 200 may control the cleaning member 230 to operate by electrical energy transmitted through the power receiver 210 or by power supplied from the internal battery. For example, the processor of the cleaning device 200 may control the internal battery to be charged by the electrical energy transmitted through the power receiver 210.

Also, the cleaning device 200 may further include a power connection terminal. For example, the processor of the cleaning device 200 may control the cleaning member 230 to operate by electrical energy delivered through the power receiver 210 or external power supplied through the power connection terminal.

FIG. 3B shows an embodiment of a cleaning device.

The cleaning device 200 of FIG. 3B is different from the cleaning device 200 of FIG. 3A in that it further includes a blocking member 240. In order to avoid duplicate descriptions, only the blocking member 240 will be described below.

The blocking member 240 may block a magnetic field. In detail, the blocking member 240 may block induction-heating of the heater (130 of FIG. 2) by a magnetic field generated by the main coil (140 of FIG. 2).

The blocking member 240 may prevent the heater (130 of FIG. 2) from being inductively heated by a magnetic field generated by the main coil (140 in FIG. 2). As such, the magnetic flux transmitted to the heater 130 is reduced, so that the heater (130 in FIG. 2) is heated to a relatively low temperature.

The blocking member 240 may include a material blocking the magnetic field. For example, the blocking member 240 may include a magnetic material, a metal material, and the like.

The blocking member 240 may be arranged to surround the sub insertion groove 250 and to be surrounded by the sub-coil 210. For example, the blocking member 240 may be arranged in an annular shape to surround the sub insertion groove 250.

The blocking member 240 may be a coating film.

FIG. 3C shows an embodiment of a cleaning device.

A cleaning device 200 of FIG. 3C has a different shape when compared with the cleaning device 200 of FIG. 3B. In detail, the cleaning device 200 of FIG. 3C further includes an annular insertion groove 260 arranged between a sub-coil 210 and a sub insertion groove 250.

When the cleaning device 200 is combined with the aerosol-generating device, the heater (130 of FIG. 2) of the aerosol-generating device may be inserted into the sub insertion groove 250, and the main coil (140 of FIG. 2) may be inserted into the annular insertion groove 260.

The cleaning device 200 may optionally include a blocking member 240. The blocking member 240 may be arranged between the sub insertion groove 250 and the annular insertion groove 260 such that the blocking member 240 is disposed between the main coil (140 in FIG. 2) and the heater (130 in FIG. 2).

FIG. 4A shows an embodiment of an aerosol-generating system. FIG. 4A shows an embodiment of an aerosol-generating system in which the aerosol-generating device of FIG. 2 and the cleaning device of FIG. 3A are combined.

The cleaning device 200 may be inserted into the main insertion groove 150 of the aerosol-generating device 100 by a user. The heater 130 may be inserted into the sub insertion groove 250 of the cleaning device 200. The main coil 140 may be arranged to surround the sub-coil 210.

Referring to FIGS. 4A and 5, the aerosol-generating system 1 may include a cleaning mode and a normal mode.

The cleaning mode is a mode in which the cleaning device 200 and the aerosol-generating device 100 are combined. The cleaning mode may include a cleaning execution mode in which the cleaning member 230 is operating, a cleaning standby mode in which the cleaning member 230 is not operating, and the like. The cleaning execution mode is a mode in which the cleaning member 230 is moved by mechanical energy received from the power converter 220, and the cleaning standby mode is a mode in which the cleaning member 230 is stopped.

When the cleaning device 200 is not combined, the aerosol-generating device 100 may operate in the normal mode, as opposed to the cleaning mode. The normal mode may include a heating mode in which the heater 130 is preheating or heating a cigarette, and a low-power mode in which the aerosol-generating device 100 is in a sleep state.

The controller 120 may switch from the normal mode to the cleaning mode so that the cleaning device 200 cleans the aerosol-generating device 100. In addition, the controller 120 may switch from the cleaning mode to the normal mode.

On detecting that the cleaning device 200 is combined with the aerosol-generating device 100, the controller 120 may switch from the normal mode to the cleaning mode. For example, the controller 120 may detect that the cleaning device 200 is inserted into the main insertion groove 150 of the aerosol-generating device 100 through impedance matching, and switch from the normal mode to the cleaning mode. As another example, when a user operates a switch, the controller 120 may determine that the cleaning device 200 has been inserted into the main insertion groove 150 of the aerosol-generating device 100, and switch from the normal mode to the cleaning mode. Examples of the switch may include, but are not limited to, a push switch, a sliding switch, and a knob switch.

Likewise, on detecting that the cleaning device 200 has been separated from the aerosol-generating device 100, and the controller 120 may switch from the cleaning mode to the normal mode. For example, the controller 120 may detect that the cleaning device 200 has been separated from the aerosol-generating device 100 through a magnetic sensor or a pressure sensor, and may switch from the cleaning mode to the normal mode. As another example, when the user operates the switch again, the controller 120 may determine that the cleaning device 200 has been separated from the aerosol-generating device 100, and switch from the cleaning mode to the normal mode.

A switching from the normal mode to the cleaning mode by the controller 120 may be switching from the normal mode to the cleaning standby mode or switching from the normal mode to the cleaning execution mode. When the controller 120 switches from the normal mode to the cleaning standby mode, an additional input signal may be required to change from the cleaning standby mode to the cleaning execution mode.

For example, the controller 120 may switch from the normal mode to the cleaning standby mode on detecting that the cleaning device 200 is combined with the aerosol-generating device 100. Then, the controller 120 may switch from the cleaning standby mode to the cleaning execution mode on sensing a switch operation by the user.

As another example, the controller 120 may switch from the normal mode to the cleaning standby mode on detecting that the cleaning device 200 is combined with the aerosol-generating device 100. Then, the controller 120 may switch from the cleaning standby mode to the cleaning execution mode when the pressure sensor 160 detects a pressure above a reference pressure. As shown in FIG. 6, a user may press the cleaning device 200 into the aerosol-generating device 100 after inserting the cleaning device 200 into the main insertion groove 150 of the aerosol-generating device 100. Accordingly, the pressure sensor 160 may be pressurized by the cleaning device 200. The controller 120 may detect that the cleaning device 200 is pressurized by the user through the pressure sensor 160 sensing a pressure equal to or greater than a reference pressure. Then, the controller 120 may switch from the cleaning standby mode to the cleaning execution mode.

The controller 120 may switch from the cleaning execution mode to the cleaning standby mode, and then switch from the cleaning standby mode to the normal mode.

For example, when the controller 120 detects that the user operates the switch again, the controller 120 may switch from the cleaning execution mode to the cleaning standby mode, and switch from the cleaning standby mode to the normal mode when the controller 120 detects that the cleaning device 200 is separated from the aerosol-generating device 100.

As another example, the controller 120 may switch from the cleaning execution mode to the cleaning standby mode when the pressure sensor 160 detects a pressure that decreases below a reference pressure, and switch from the cleaning standby mode to the normal mode when the controller 120 detects that the cleaning device 200 is separated from the aerosol-generating device 100. When a user stops pressing the cleaning device 200 toward the aerosol-generating device 100, the pressure sensor 160 may sense a pressure that decreases below a reference pressure.

In the above, examples have been described in which the controller 120 switches the mode of the aerosol-generating system 1. Alternatively, the cleaning device 200 may include a processor, and a mode switching of the aerosol-generating system 1 may be performed by the processor included in the cleaning device 200. Alternatively, the controller 120 and the processor included in the cleaning device 200 may perform wireless communication to switch the mode of the aerosol-generating system 1.

When the cleaning mode starts while the cleaning device 200 is combined with the aerosol-generating device 100, electrical energy may be transferred from the power transmitter 140 to the power receiver 210. Then, the power converter 220 may convert the electrical energy to mechanical energy, and the cleaning member 230 may operate by the mechanical energy to clean the aerosol-generating device 100.

For example, a current may be induced in the sub-coil 210 by a magnetic field generated by the main coil 140, and a motor may operate by the current such that the cleaning member 230 may operate by the motor.

The cleaning device 200 may operate without an internal battery or a wired power connection, because the cleaning device 200 may receive electrical energy wirelessly from the power transmitter 140 through the power receiver 210. Accordingly, a weight of the cleaning device 200, manufacturing costs, and the like may be reduced. Also, a user may conveniently use the cleaning device 200 without having to charge the cleaning device 200. In addition, the aerosol-generating device 100 may supply power to the cleaning device 200 without additional components, because electrical energy is transmitted to the cleaning device 200 using the power transmitter 140 that is already included in the aerosol-generating device 100 to heat the heater 130.

The controller 120 may adjust a frequency of a current delivered to the main coil 140 according to the mode of the aerosol-generating system 1.

The controller 120 may control power such that a current of a first frequency flows through the main coil 140 in the cleaning mode, and a current of a second frequency flows through the main coil 140 in the normal mode. For example, the controller 120 may control power such that the current of the first frequency flows through the main coil 140 in the cleaning execution mode, and the current of the second frequency flows through the main coil 140 in the heating mode.

Alternatively, the controller 120 may control power so that currents having the first frequency and the second frequency flow through the main coil 140 in the cleaning execution mode and the heating mode.

The first frequency and the second frequency may be different frequencies. For example, the first frequency is a frequency of a current for transmitting electrical energy to the sub-coil 210 so that the cleaning member 230 operates, and the second frequency may be a frequency of a current by which the main coil 140 may induction-heat the heater 130. That is, the first frequency may be a frequency of a current for transmitting electrical energy required for an operation of the cleaning member 230, and the second frequency may be a frequency of a current required for induction-heating the heater 130.

In the cleaning mode, as the current of the first frequency rather than the second frequency flows through the main coil 140, the heater 130 may not generate heat or may generate heat at a lower temperature than in the heating mode. As such, damage to the cleaning member 230 may be prevented. In addition, in the cleaning mode, since the heater 130 generates heat at a low temperature, foreign substances on the heater 130 may be more easily removed.

Alternatively, the first frequency and the second frequency may be the same frequency. For example, when the frequency of the current for transmitting the electrical energy required for the operation of the cleaning member 230 and the frequency of the current required for induction-heating the heater 130 are the same, the first frequency and the second frequency may be the same.

Even if the cleaning device 200 operates by the current of the first frequency, and at the same time, the heater 130 is inductively heated by the current of the second frequency that is the same as the first frequency, if the cleaning member 230 is made of a heat-resistant material, cleaning may be performed without thermal deformation due to the heater 130.

The controller 120 may adjust a frequency of a current through a filter. For example, the controller 120 may control the current of the first frequency or the second frequency to be selectively transmitted to the main coil 140 through a band pass filter. As another example, the controller 120 may control the currents having the first frequency and the second frequency to be transmitted to the main coil 140 through a broadband pass filter.

FIG. 4B shows an embodiment of an aerosol-generating system. FIG. 4B shows an embodiment of an aerosol-generating system in which the aerosol-generating device of FIG. 2 and the cleaning device of FIG. 3B are combined.

The blocking member 240 may be arranged between the heater 130 and the main coil 140 while the aerosol-generating device 100 and the cleaning device 200 are combined. The blocking member 240 may block a magnetic field generated by the main coil 140 to prevent the heater 130 from being inductively heated.

On the other hand, since the blocking member 240 does not exist between the main coil 140 and the sub-coil 210, a current may be induced in the sub-coil 210 by the main coil 140.

Even if the first frequency and the second frequency are the same, or the currents of the first frequency and the second frequency are simultaneously supplied to the main coil 140, since the magnetic field generated by the main coil 140 is blocked by the blocking member 240, the heater 130 may be prevented from being inductively heated or may be heated to a relatively low temperature in the cleaning mode.

FIG. 4C shows an embodiment of an aerosol-generating system. FIG. 4C shows an embodiment of an aerosol-generating system in which the aerosol-generating device of FIG. 2 and the cleaning device of FIG. 3C are combined.

The cleaning device 200 may be inserted into the main insertion groove 150 of the aerosol-generating device 100, such that the heater 130 is placed in the sub insertion groove 250 of the cleaning device 200. In addition, the main coil 140 of the aerosol-generating device 100 may be inserted into the annular insertion groove 260 of the cleaning device 200.

Like the aerosol-generating system of FIG. 4B, when the aerosol-generating device 100 and the cleaning device 200 are combined, the blocking member 240 may be arranged between the heater 130 and the main coil 140. The blocking member 240 may block the magnetic field generated by the main coil 140 to prevent the heater 130 from being inductively heated.

A shape of the aerosol-generating system 1 shown in FIGS. 4A to 4C is only an example, and the shape of the aerosol-generating system 1 is not limited thereto.

At least one of the components, elements, modules or units (collectively "components" in this paragraph) represented by a block in the drawings, such as the controller 120 FIGS. 2 and 4A-4C, may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

Those of ordinary skill in the art related to the present embodiments may understand that various changes in form and details can be made therein without departing from the scope of the characteristics described above. The disclosed methods should be considered in a descriptive sense only and not for purposes of limitation. The scope of the present disclosure is defined by the appended claims rather than by the foregoing description, and all differences within the scope of equivalents thereof should be construed as being included in the present disclosure.

The invention claimed is:

1. A cleaning device used to clean an aerosol—generating device comprising a main coil for heating a heater, the cleaning device comprising:

a power receiver configured to wirelessly receive electrical energy from the aerosol-generating device;

a power converter configured to convert the electrical energy received by the power receiver to mechanical energy; and a cleaning member configured to clean the aerosol-generating device by the mechanical energy, wherein the power receiver includes a sub-coil configured to generate a current that is induced by the main coil.

2. The cleaning device of claim 1, wherein the power converter includes a motor.

3. The cleaning device of claim 1, further comprising: a sub-insertion groove; and a blocking member arranged to surround the sub insertion groove and to be surrounded by the sub-coil, wherein the sub-coil is configured to be arranged to surround the sub insertion groove.

4. An aerosol-generating system comprising:

an aerosol-generating device comprising:

a battery;

a power transmitter configured to heat a heater by receiving power from the battery; and a controller configured to control the power supplied from the battery to the power transmitter; and a cleaning device comprising:

a power receiver configured to wirelessly receive electrical energy from the power transmitter;

a power converter configured to convert the electrical energy received by the power receiver to mechanical energy; and a cleaning member configured to clean the aerosol-generating device by the mechanical energy, wherein the power transmitter includes a main coil for heating the heater, and wherein the power receiver includes a sub-coil configured to generate a current that is induced by the main coil.

5. An aerosol-generating system comprising:

an aerosol-generating device comprising:

a battery;

a power transmitter configured to receive power from the battery; and a controller configured to control the power supplied from the battery to the power transmitter; and a cleaning device comprising:

a power receiver configured to wirelessly receive electrical energy from the power transmitter;

a power converter configured to convert the electrical energy received by the power receiver to mechanical energy; and a cleaning member configured to clean the aerosol-generating device by the mechanical energy wherein the power transmitter includes a main coil, the power receiver includes a sub-coil configured to generate a current induced by the main coil, the aerosol-generating system operates in a cleaning mode when the aerosol-generating device and the cleaning device are combined, and operates in a normal mode when the aerosol-generating device and the cleaning device are separated from each other, and the controller controls the power such that a current having a first frequency flows through the main coil in the cleaning mode and a current having a second frequency flows through the main coil in the normal mode.

6. The aerosol-generating system of claim 5, wherein the aerosol-generating device further includes a heater configured to be inductively heated by the main coil.

7. The aerosol-generating system of claim 5, wherein the first frequency is identical to the second frequency.

8. The aerosol-generating system of claim 6, wherein the first frequency is different from the second frequency.

9. The aerosol-generating system of claim 8, wherein
the current having the first frequency transmits electrical energy to the sub-coil such that the cleaning member operates, and
the current having the second frequency causes the main coil to inductively heat the heater.

10. The aerosol-generating system of claim 6, wherein
the aerosol-generating device further includes a main insertion groove in which the heater is arranged and the cleaning device is inserted,
the cleaning device further includes a sub insertion groove into which the heater is inserted,
the main coil is arranged to surround the main insertion groove, and
the sub-coil is arranged to surround the sub insertion groove.

11. The aerosol-generating system of claim 10, wherein the cleaning device further includes a blocking member arranged between the main coil and the heater while the aerosol-generating device and the cleaning device are combined, such that a magnetic field generated by the main coil is blocked by the blocking member.

12. The aerosol-generating system of claim 6, wherein the heater is heated at a lower temperature in the cleaning mode than in the normal mode.

13. The aerosol-generating system of claim 10, wherein
the cleaning mode includes a cleaning standby mode in which the cleaning member does not operate and a cleaning execution mode in which the cleaning member operates,
the aerosol-generating device further includes a pressure sensor configured to detect a pressure applied against a bottom of the main insertion groove, and
the controller switches from the cleaning standby mode to the cleaning execution mode when the detected pressure is equal to or greater than a reference pressure.

* * * * *